United States Patent [19]

Locatelli et al.

[11] 4,224,216

[45] Sep. 23, 1980

[54] POLYPROPYLENE/GLASS FIBER/IMIDE/THERMOPLASTIC ELASTOMER BASED COMPOSITIONS

[75] Inventors: Jean-Louis Locatelli, Vienne; Louis Macabrey, Mitry-le Neuf, both of France

[73] Assignee: Rhone-Poulenc Industries, Paris, France

[21] Appl. No.: 961,770

[22] Filed: Nov. 17, 1978

[30] Foreign Application Priority Data

Nov. 18, 1977 [FR] France ................................ 77 34686

[51] Int. Cl.$^2$ ............................................... C08K 7/14
[52] U.S. Cl. ............................ 260/42.18; 260/37 N; 260/42.14; 260/42.15; 525/125; 525/179; 525/232

[58] Field of Search ............... 260/42.18, 42.14, 42.15, 260/37 N; 525/125, 179, 232

[56] References Cited

U.S. PATENT DOCUMENTS 3,853,808   12/1974   Kishikawa et al. ............... 260/42.18

*Primary Examiner*—Melvyn I. Marquis
*Attorney, Agent, or Firm*—Burns, Doane, Swecker & Mathis

[57] ABSTRACT

A molding composition is comprised of (A) polypropylene, (B) glass fibers, (C) an unsaturated dicarboxylic acid imide, and (D) a thermoplastic elastomer, and is useful for the fabrication of a variety of shaped articles, especially for the automotive industry [e.g., radiators, battery casings, fans, etc.].

18 Claims, No Drawings

POLYPROPYLENE/GLASS FIBER/IMIDE/THERMOPLASTIC ELASTOMER BASED COMPOSITIONS

BACKGROUND OF THE INVENTION

1. Field of the Invention

The present invention relates to novel compositions of matter based on polypropylene and glass fibers.

2. Description of the Prior Art

It is known in this art to improve the mechanical properties of thermoplastic polymers by incorporating glass fibers therein. However, such combinations entail problems of adherence of the glass fibers to the polymer and for this reason, in the case wherein the polymer in question is polypropylene, U.S. Pat. No. 3,853,808, for example, specifies the admixture of a certain amount of bis-maleimide to the polypropylene, followed by formulation into a composition which also includes glass fibers. Articles shaped from this composition display good mechanical properties, but it appears that high elastic modulus values are necessarily associated with low impact strengths at low temperatures.

SUMMARY OF THE INVENTION

Accordingly a major object of the present invention is the provision of novel compositions of matter based on polypropylene and glass fibers, which compositions can be shaped into articles displaying notably desirable elastic modulus values and impact strengths at low temperatures, as will hereinafter more fully be seen.

Briefly, the subject compositions according to the invention comprise (A) polypropylene, (B) an unsaturated dicarboxylic acid imide, (C) glass fibers, and such compositions being characterized in that they also comprise (D) a thermoplastic elastomer.

DETAILED DESCRIPTION OF THE INVENTION

More particularly according to the invention, the amounts of the different components of the subject compositions are expressed as follows (by weight):

(i) The polypropylene (A) represents 30 to 99% by weight of the total weight of the mixture of the polypropylene (A) and the thermoplastic elastomer (D);

(ii) The imido compound (B) represents 0.01 to 10% by weight of the total weight of the mixture of the polypropylene (A), the elastomer (D) and the glass fibers (C);

(iii) The glass fibers represent 1 to 50% by weight of the total weight of the mixture of the polypropylene (A), the elastomer (D) and the glass fibers (C).

The polypropylene employed in the subject compositions may be selected from among any of the different varieties of crystalline polypropylene containing at least 50% by weight isotactic component, and having an index of fluidity between 0.2 and 15 as determined by ASTM standard 1238-72 (at 230° C. under a load of 2.10 kg) and a molecular weight of from 250,000 to 700,000.

Such polymers may be prepared by known catalytic methods, such as the typical techniques of Ziegler-Natta type.

The polypropylenes may consist of homopolymers of propylene or of propylene/ethylene copolymers, which preferably contain up to 10% by weight of ethylene. Among the copolymers, preferred are the sequential copolymers comprising polypropylene chains and elastomeric chains, such elastomers themselves consisting of a propylene/ethylene copolymer wherein the proportion of ethylene may be up to 30% by weight.

In the compositions according to the invention, the polypropylene proportion in the (A)+(D) mixture mentioned hereinabove is preferably between 50 and 95% by weight.

The thermoplastic elastomer (D) comprises, within the ambit of the invention, an ethylene based elastomeric copolymer including at least one other olefinic comonomer, said copolymer having an essentially amorphous structure (crystalline proportion less than 15%) and a Mooney ML—4 NF standard T 43005 viscosity between 20 and 120 at 121° C.

These polymers, more specifically, may consist of ethylene/propylene copolymers containing 40 to 80% by weight of ethylene derived units. Copolymers of ethylene and butene-1 or of ethylene and butadiene, or terpolymers, particularly ethylene based terpolymers, of propylene and unsaturated acids such as maleic acid or aliphatic dienes, particularly nonconjugated dienes such as 1,4-pentadiene; 2-methyl-1,4-pentadiene; 1,5-hexadiene; 1,4-hexadiene; 2-methyl-1,5-hexadiene; or also endomethylene diolefins, such as dicyclopentadiene, norbornadiene, methylenenorbornene, or certain cyclic diolefins such as 1,5-cyclooctadiene. As a general rule, the proportion of the third comonomer, such as those noted hereinabove, does not represent more than 5% of the total weight of the terpolymer.

The thermoplastic elastomers as above described may be prepared via those methods described in *Encyclopedia of Polymer Science and Technology*, Ed. 1967, Vol. 6, pages 359ff.

The component (B) of the compositions according to the invention is a compound comprising an unsaturated dicarboxylic acid imide group. This expression denotes compounds, mixtures of compounds and macromolecular compounds prepared under conditions such that each of said compounds contains n recurring units of the structural formula:

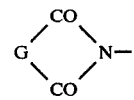

wherein n is an average value of from 1.2 to 5 and G represents one of the following radicals:

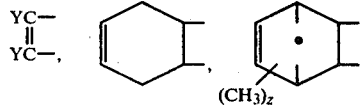

wherein Y represents H, CH$_3$ or Cl and z is 0, 1 or 2.

The component (B) may be selected, more precisely, from among the bis-imides, polyimides containing 3 to 5 unsaturated carboxylic acid imide groups, mixtures of mono-imides and bis-imides and/or polyimides and compounds obtained from the bis-imides or polyimides above noted and compounds containing functional groups capable of reacting with the groups represented by the symbol G hereinabove, to form macromolecular chains.

The component (B) is notably a bis-imide of the structural formula:

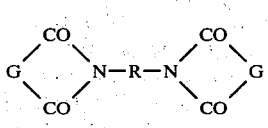

wherein G is as above defined and R represents a divalent radical selected from among the following radicals:
(a) A linear or branched chain alkylene radical containing up to 13 carbon atoms;
(b) A cyclohexylene or cyclopentylene radical;
(c) One of the radicals of the formulae:

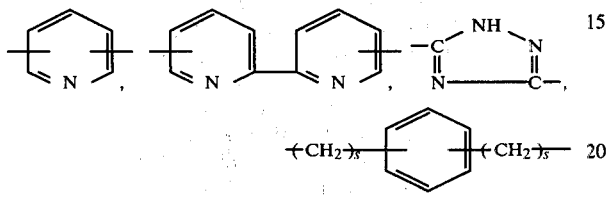

wherein s is equal to 1, 2 or 3;
(d) A radical comprising two phenylene radicals linked together by a simple valence bond or by means of a hetero atom or inert group, particularly $-CH_2-$, $-O-$, $-C(CH_3)_2-$, $-SO_2-$, $-S-$.

As specific examples of such bis-imides, the following are noted as illustrative:
N,N'-ethylene-bis-maleimide;
N,N'-metaphenylene-bis-maleimide;
N,N'-paraphenylene-bis-maleimide;
N,N',4,4'-diphenylmethane-bis-maleimide;
N,N',4,4'-diphenylether-bis-maleimide;
N,N'4,4'-diphenylsulfone-bis-maleimide;
N,N'4,4'-diphenylmethane-bis-tetrahydrophthalimide; and
N,N',4,4'-diphenylmethane-bis-chloromaleimide.

These bis-imides can be prepared according to the methods described, for example, in U.S. Pat. No. 3,018,290 or British Patent Specification No. 1,137,592.

The component (B) may also consist of polyimides of the structural formula:

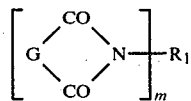

wherein the symbol G is as defined above and the symbol $R_1$ represents a radical having a valence of m, m preferably being comprised between 3 and 5 (average value); this radical specifically may consist of several benzene rings linked to each other by those hetero atoms or inert groups mentioned previously. Such polyimides may be prepared by the methods described in British Patent Specification No. 1,348,077.

The component (B) may also consist of a mixture comprising one or more of the bis-imides or polyimides noted hereinabove and one or more mono-imides of the structural formula:

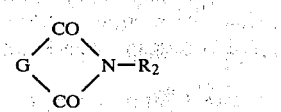

wherein $R_2$ represents a hydrogen atom or a monovalent hydrocarbon radical, aliphatic, cycloaliphatic or aromatic, containing up to 20 carbon atoms.

As specific examples of such mono-imides, the following are illustrative: maleimide; N-phenylmaleimide; N-phenylmethylmaleimide; N-phenylchloromaleimide; N-p.chlorophenylmaleimide; N-p.methoxyphenylmaleimide; maleimido-4-acetoxysuccinimido-4'-diphenylmethane; maleimido-4-acetamido-4'-diphenylmethane; N-vinylmaleimide; N-allylmaleimide.

These mono-imides, having a proportion in the mixture with the bis-imides or polyimides such that the average value of n is at least 1.2, may be prepared by the methods described, for example, in U.S. Pat. Nos. 2,444,536 and 3,717,615, or in German Patent Application (DOS) No. 2,354,654.

As indicated previously, the component (B) may also consist of a macromolecular compound containing on the average n recurring units of the structural formula:

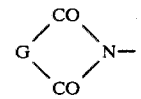

(n being as previously defined).

As indicated hereinabove, such macromolecular compounds may be prepared by the reaction of a bis-imide or a polyimide (and optionally a mono-imide) with a compound bearing functional groups which react with the unsaturated moiety of said imides (represented by the symbol G) in proportions, or under conditions, such that a portion of the unsaturated acid imide groups is not affected by the reaction. In practice, if $m_1$ designates the amount of unsaturated imide groups contributed by the compound comprising the imide function to the reaction and $m_2$ the amount of groups reactive with said unsaturation, contributed by competing reagent or reagents, the operation is conducted with proportions such that the average value of the ratio $m_1/m_2$ is between 1.2 and 10.

The competing reactant may be selected from among various compounds known to react with the unsaturated carboxylic acid imides. As examples of such competing reactants, the following are illustrative: the products of the reaction of a bis- or polyimide with polyamines, particularly bis-primary diamines of the formula $H_2N-R'-NH_2$, wherein the symbol R' may represent one of the radicals mentioned previously in connection with the definition of the symbol R. The polyamines may also contain more than two $-NH_2$ groups. Such polyamines may be represented by the formula $(NH_2)_{m'}-R_1'$, wherein the symbols m' and $R_1'$ may have the meanings given respectively for m and $R_1$ in connection with the definition of the polyimides. These diamines or polyamines may be used in admixture, either of same belonging to the above two categories, or in admixture with primary mono-amines, or the mono- or secondary polyamines. With respect to the reaction of the compounds bearing the imide function with the compound bearing the amine function, reference is made to the following patents: U.S. Pat. No. Re. 29,316, and U.S. Pat. Nos. 3,883,486 and 3,840,495, hereby expressly incorporated by reference.

In the present invention, such macromolecular compounds are utilized at their prepolymer stage, i.e., at the stage wherein there are carbon-carbon double bonds of the compound bearing the imide function capable of subsequent or further reaction. Such prepolymers are generally obtained by mixing and heating the reagents between 50° and 180° C. for a period of time to yield a polymer soluble in solvents such as dimethylformamide, N-methyl-2-pyrrolidone, and having a softening point within the temperature range of 60° to 150° C.

As the macromolecular compound, the product of the reaction of the bis- or polyimides cited hereinabove with N-vinyl-2-pyrrolidone may also be used. Reference is made to British Patent Specification No. 1,516,445 for the preparation of such materials. In the present invention, such compounds or polymers are preferably employed in the powder form. To prepare same, the polymers are partially hardened by heating to a temperature of from 80° to 180° C., whereby the resultant polymer will have a softening point of between 30° and 150° C. The polymers defined hereinabove and resulting from the reaction of bis- or polyimides with a polyamine or with N-vinylpyrrolidone, may be used as such, or they may be modified by the addition of various modifiers. The addition of unsaturated polyesters, or of solutions of unsaturated polyesters in a polymerizable monomer, is most notable. If polymers obtained from polyimides are involved, reference is made to U.S. Pat. No. 3,712,933 with respect to the addition of unsaturated polyesters. Concerning N-vinylpyrrolidone, British Pat. No. 1,516,445 mentioned above is again referred to. As examples of suitable polyesters, polyesters obtained from maleic acid and trans-nadic acid and propylene and ethylene glycol are especially noteworthy, such polyesters being preferably employed in the form of a solution in allyl phthalate.

As a macromolecular compound, the product obtained from a bis-imide or a polyimide and a polyisocyanate may also be utilized. The reaction between these two reactants consists essentially of an addition of the NCO group to one of the unsaturated carbon atoms of the reactant comprising the imide function. As hereinbefore mentioned, the amounts of the reagents employed are such that imide groups comprising double bonds are retained in the compositions according to the invention. The term polyisocyanate designates herein a compound containing at least two NCO groups, with the proviso that mixtures of polyisocyanates having differing numbers of NCO functions may be used. In accordance with the well known chemistry in the field of isocyanates, the products may consist of monomers (products having low molecular weights) or of prepolymers.

As specific examples of the monomers, the following compounds are illustrative:
Diisocyanato-2,4-toluene;
Mixtures of diisocyanato-2,4-toluene and diisocyanato-2,6-toluene;
Bis(isocyanato-4-phenyl)methane;
Diisocyanato-1,5-naphthalene;
Paraphenylene diisocyanate;
Tris(isocyanato-4-phenyl)methane;
Diisocyanato-2,4-chlorobenzene;
Bis(isocyanato-4-phenyl)ether;
Diisocyanato-1,6-hexane;
Dimethyl-3,3'-diisocyanato-4,4'-biphenyl;
Bis(isocyanato-4-cyclohexyl)methane;
Bis(methyl-3-isocyanato-4-phenyl)methane;
Bis(isocyanato-4-phenyl)propane;
Diisocyanato-4,4'-dichloro-3,3'-diphenyl;

Polyisocyanates having the structural formula:

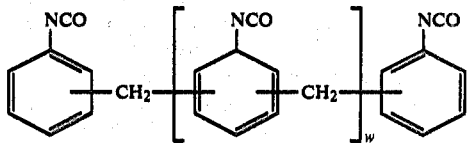

wherein w ranges from 0.1 and 4.

The polyisocyanate prepolymer may be obtained by reaction of a molar excess of diisocyanate with a polymer containing at least two hydroxyl or amino groups. Such a hydroxyl polymer may consist, for example, of a hydroxylated polybutadiene, castor oil, hydroxylated epoxy resin or, preferably, a polyester or polyether polyol.

The preparation of such prepolymers is described, for example, in the work by Saunders, "Polyurethane Chemistry and Technology," Part I, 1962.

The compositions according to the invention also contain glass fibers (C). The amount of glass fibers preferably represents 10 to 40% by weight of the total weight of the mixture (A)+(B)+(C)+(D). The glass fibers preferably have lengths comprised between 100$\mu$ and 12 mm, the diameter of single fibers generally being between 2 and 20$\mu$. Type E fibers are preferred (defined in "Handbook of Reinforced Plastics," ed. 1964, p. 120), the gauge thereof (weight per kilometer of filament) varying between 600 and 2500 dtex. Although the fibers of the E type are considered particularly suitable for the applications for which the compositions according to the invention are intended, other fibers may be used, either exclusively, or in association with E type fibers. The text noted above indicates (pp. 121-122) certain examples of such fibers, and same is hereby expressly incorporated by reference.

In general, the glass fibers utilized in the invention are treated fibers. On the one hand, the fibers may be bundled by means of a binder. As examples of such binders, polyvinyl acetate, copolymers of ethylene and acrylic esters, epoxy resins, polyethers and aromatic polyesters, are illustrative. On the other hand, the fibers may be treated with a sizing or coupling agent such as, for example, organosilicon compounds such as vinyl-tri(ethoxymethoxy)silane, $\gamma$-amino-propyltriethoxysilane, [(amino-2-ethylamino)-3-propyl] trimethoxysilane, vinyl(methacryloyl) trimethoxysilane, or compounds such as the complexes of chromium with methacrylic acid.

The compositions according to the invention may be prepared by the simple mixing of the various components (A), (B), (C), and (D). According to a preferred method, the operation is performed in two stages: initially, polypropylene, the thermoplastic elastomer and the imido compound are mixed together; then, following the homogenization of the mixture, the glass fibers are introduced while continuing the homogenization operation. These operations generally are conducted at ambient temperature (15° to 30° C.). The composition prepared in this manner may subsequently be directly molded by compression at a temperature between 180° and 260° C., under a pressure of 100 to 400 bars, or it may be extruded at a temperature of 180° to 260° C., then granulated and molded by compression at a temperature of 180° to 260° C. and under a pressure of 500 to 1500 bars. The second technique is typically utilized because of the ease with which it is performed.

The articles shaped, e.g., by molding, from the compositions according to the invention reflect a number of favorable properties. They are particularly remarkable in relation to modulus of elasticity and impact strength at low temperatures; also as regards creep resistance. The methods used to determine these properties are indicated hereinafter.

Due to these properties, the compositions of the invention are particularly suitable for the manufacture of articles used in the automotive industry (radiators, battery casings, fans), for the production of machining blanks to replace light alloys.

In order to further illustrate the present invention and the advantages thereof, the following specific examples are given, it being understood that same are intended only as illustrative and in nowise limitative.

In the said examples which follow, the starting materials and the various tests were the following:

Polypropylene (polymer A in the table): polypropylene, 95% isotactic component and having an index of fluidity 5 (conditions as defined previously) and an average molecular weight of 320,000.

Polypropylene copolymer (polymer $A_2$): sequential copolymer of polypropylene and elastomeric segments, said segments consisting of a copolymer of propylene and ethylene (70/30 by weight), the copolymer containing a total of 90% by weight of propylene and 10% by weight of ethylene. This copolymer had an index of fluidity of 3.5 (under conditions as defined previously) and a molecular weight of 360,000.

Bis-maleimide: N,N',4,4'-diphenylmethane-bis-maleimide.

Polyimide prepolymer (polymer B): product obtained from 75 g bis-maleimide, 12.5 g N-vinyl-2-pyrrolidone and 12.5 g of a solution composed of 40% diallyl phthalate and 60% of a polyester obtained from maleic acid and propylene and ethylene glycols. This product, prepared by mixing together the components at 120° C., then maintaining same at 140° C. for 35 min. to obtain a powder with a softening point of 71° C.

Glass fibers of the E type.

$C_1$: fibers with a strand length of 6 mm, the fibers being bonded together by means of an aromatic polyether and sized with γ-aminopropyltriethoxysilane.

$C_2$: fibers with a length of 6 mm, bonded by means of an epoxy resin and treated with vinyl-tri(ethoxymethoxy)silane (sizing).

$C_3$: fibers with a length of 6 mm, bonded by means of an aromatic polyether and treated with a chromium complex.

Plastic elastomer (polymer D): elastomer prepared from ethylene, propylene and a dienic monomer, with a high content in ethylene (70%) and a low hexanediene-1,4-content, having a MOONEY [ML (1+4)] at 121° C. viscosity equal to 60±6.

Tests:
Elastic modulus      ASTM standard 0790-63

CHARPY impact strength      ASTM standard 0256-56.

EXAMPLE 1

The following mixture was homogenized for one minute on a roll mixer:

70 parts of a composition based on polypropylene consisting of 50% by weight of polymer (A) in powder form, defined previously, and 50% by weight of the thermoplastic elastomer (D), 0.6 part of N,N',4,4'-diphenylmethane-bis-maleimide, 30 parts $C_1$ glass fibers.

The mixture was extruded at 210° C. via a single screw extruder. The bar extrudate issuing from the extruder was granulated and injection molded at 240° C. in an injection mold having a mold temperature of 25° C. (pressure: 1350 bars—counterpressure 150 bars).

The mechanical properties determined on the shaped articles are reported in Table 1.

EXAMPLES 2 TO 7

The different experiments were performed according to the conditions described in Example 1, but by using variable proportions of the different components; test results are compiled in Table 1.

Controls were prepared under the conditions indicated in Example 1, but without the addition of the elastomer (D).

A comparison between the tests according to the invention and the controls demonstrates that only the articles made of the compositions containing the thermoplastic elastomer have simultaneously a high elastic moduli and equally high low temperature (−20° C.) impact strengths.

EXAMPLE 8

Example 1 was reproduced by replacing the N,N',4,4'-diphenylmethane-bis-maleimide with polymer B (the bis-maleimide mentioned previously copolymerized with N-vinyl-2-pyrrolidone).

The molded shaped articles obtained had an elastic modulus at 23° C. of 2330 MPa and an impact strength at −20° C. of 10.56 kg. cm/cm$^3$.

TABLE 1

| Example | Nature of the polypropylene | Polypropylene/ elastomer ratio | Nature of the glass fibers & proportion* | Bis-maleimide proportion in % | Elastic Modulus at 23° C. MPa | Impact Strength at −20° C. in kg . cm/cm$^3$ |
|---|---|---|---|---|---|---|
| 1 | polymer $A_2$ | 1 | 30% of $C_1$ | 0.6 | 2150 | 11.87 |
| 2 | polymer $A_2$ | 1 | 30% of $C_2$ | 0.3 | 2416 | 9.7 |
| 3 | polymer $A_2$ | 3 | 30% of $C_1$ | 0.3 | 3133 | 7.45 |
| 4 | polymer $A_2$ | 1.5 | 40% of $C_1$ | 3.0 | 3930 | 11.26 |
| 5 | polymer $A_2$ | 0.5 | 40% of $C_1$ | 3.0 | 3655 | 8.72 |
| 6 | polymer $A_1$ | 7 | 30% of $C_1$ | 1.0 | 4650 | 8.10 |
| 7 | polymer $A_1$ | 7 | 30% of $C_3$ | 1.0 | 4500 | 8.0 |
| Control | polymer $A_1$ | — | 30% of $C_1$ | 3.0 | 4628 | 5.2 |

TABLE 1-continued

| Example | Nature of the polypropylene | Polypropylene/ elastomer ratio | Nature of the glass fibers & proportion* | Bis-maleimide proportion in % | Elastic Modulus at 23° C. MPa | Impact Strength at −20° C. in kg . cm/cm³ |
| --- | --- | --- | --- | --- | --- | --- |
| | polymer A₂ | | 30% of C₁ | 1.0 | 4238 | 5.05 |

*in percentage of the mixture of polypropylene + fibers + elastomer

While the invention has now been described in terms of various preferred embodiments and illustrated with respect to certain examples, it will be apparent to the skilled artisan that various omissions, substitutions, modifications and the like may be made without departing from the spirit of the invention. Accordingly, it is intended that the scope of the present invention be limited only by the following claims.

What is claimed is:

1. A composition of matter, comprising (A) polypropylene, (B) an unsaturated dicarboxylic acid imide, (C) glass fibers, and (D) a thermoplastic ethylene elastomer.

2. The composition of matter as defined by claim 1, wherein the amount of polypropylene (A) constitutes 30 to 99% by weight of the total weight of the mixture of polypropylene (A) and elastomer (D), and wherein the amount of imide (B) constitutes 0.01 to 10% by weight of the total weight of the mixture of polypropylene (A), elastomer (D) and glass fibers (C).

3. The composition of matter as defined by claim 2, wherein the polypropylene is a crystalline polypropylene, being at least 50% by weight isotactic and having a molecular weight of from 250,000 to 700,000.

4. The composition of matter as defined by claim 3, wherein the thermoplastic elastomer is a copolymer based on ethylene and at least one other olefinically unsaturated comonomer copolymerizable therewith, having an essentially amorphous structure, and having a MOONEY ML—4 viscosity between 20 and 120 at 121° C.

5. The composition of matter as defined by claim 4, wherein the elastomer is an ethylene/propylene copolymer containing 40 to 80% by weight of recurring ethylene units.

6. The composition of matter as defined by claim 4, wherein the elastomer is a terpolymer of ethylene, propylene and a comonomer selected from the group comprising unsaturated carboxylic acids or nonconjugated aliphatic dienes.

7. The composition of matter as defined by claim 4, wherein the imide (B) comprises n recurring units of the structural formula:

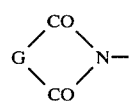

wherein n represents an average value of from 1.2 to 5 and G is one of the radicals:

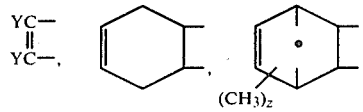

wherein Y represents H, CH₃ or Cl and z is equal to 0, 1 or 2.

8. The composition of matter as defined by claims 4 or 7, wherein the imide (B) is selected from the group comprising bis-imides, polyimides containing 3 to 5 imide groups, mixtures of bis- and/or polyimides with mono-imides, and macromolecular compounds comprising bis-polyimide reaction products.

9. The composition of matter as defined by claim 8, wherein the imide (B) is a macromolecular compound reaction product of a bis- and/or polyimide with a polyamine, N-vinyl-2-pyrrolidone or a polyisocyanate.

10. The composition of matter as defined by claim 4, wherein the glass fibers (C) are of Type E and have lengths between 100μ and 12 mm.

11. The composition of matter as defined by claim 10, wherein the glass fibers (C) are bundled.

12. The composition of matter as defined by claim 11, wherein the glass fibers (C) are bundled by means of a binder selected from the group consisting of polyvinyl acetate, copolymers of ethylene and acrylic esters, epoxy resins, polyethers and aromatic polyesters.

13. The composition of matter as defined by claim 10, wherein the glass fibers (C) have been treated with a sizing or coupling agent.

14. The composition of matter as defined by claim 13, wherein the sizing or coupling agent is selected from the group consisting of aminosilanes, vinylsilanes and complexes of chromium.

15. A shaped article comprising the composition of matter as defined by claim 1.

16. A molded shaped article comprising the composition of matter as defined by claim 1.

17. The composition of matter as defined by claim 4, wherein the imide (B) is a bis-imide having the structural formula:

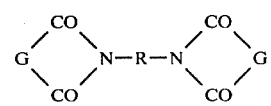

wherein R is selected from the group consisting of a linear or branched chain alkylene radical containing up to 13 carbon atoms; cyclohexylene; cyclopentylene; a member selected from the group consisting of

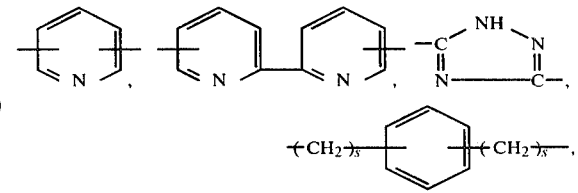

wherein s is equal to 1, 2 or 3; and a member comprising two phenylene radicals linked together by a member selected from the group consisting of a valence bond, —CH₂—, —O—, —C(CH₃)₂—, —SO₂— and —S—.

18. The composition of matter as defined by claim 17, wherein the bis-imide is selected from the group consisting of N,N'-ethylene-bis-maleimide; N,N'-metaphenylene-bis-maleimide; N,N'-paraphenylene-bis-maleimide; N,N',4,4'-diphenylmethane-bis-maleimide; N,N',4,4'-diphenylether-bis-maleimide; N,N',4,4'-diphenylsulfone-bis-maleimide; N,N',4,4'-diphenylmethane-bis-tetrahydrophthalimide; and N,N',4,4'-diphenylmethane-bis-chloromaleimide.

* * * * *